United States Patent
Goodson

(10) Patent No.: US 11,388,003 B2
(45) Date of Patent: Jul. 12, 2022

(54) INTEGRATION OF POWER SYSTEM DATA ONTO A DISTRIBUTED LEDGER

(71) Applicant: Schweitzer Engineering Laboratories, Inc., Pullman, WA (US)

(72) Inventor: Andrew Scott Goodson, Charlotte, NC (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 300 days.

(21) Appl. No.: 16/425,753

(22) Filed: May 29, 2019

(65) Prior Publication Data

US 2020/0112434 A1 Apr. 9, 2020

Related U.S. Application Data

(60) Provisional application No. 62/742,816, filed on Oct. 8, 2018.

(51) Int. Cl.
  *H04L 29/06* (2006.01)
  *H04L 9/30* (2006.01)
  *H04L 9/00* (2022.01)

(52) U.S. Cl.
  CPC . *H04L 9/30* (2013.01); *H04L 9/50* (2022.05)

(58) Field of Classification Search
  CPC ... H04L 9/30; H04L 2209/38; Y02B 70/3225; Y04S 10/22
  See application file for complete search history.

(56) References Cited

U.S. PATENT DOCUMENTS

| | | | |
|---|---|---|---|
| 10,755,226 B1* | 8/2020 | Robyak | G06K 7/10366 |
| 2017/0103468 A1 | 4/2017 | Orsini | |
| 2017/0358041 A1* | 12/2017 | Forbes, Jr. | G06Q 10/00 |
| 2018/0176229 A1* | 6/2018 | Bathen | H04W 12/106 |
| 2019/0314726 A1* | 10/2019 | Masini | G07F 17/326 |
| 2019/0353709 A1* | 11/2019 | Kaisers | G01R 31/396 |

FOREIGN PATENT DOCUMENTS

| | | | |
|---|---|---|---|
| WO | 2016151316 A1 | 9/2016 | |
| WO | WO-2018127923 A1 * | 7/2018 | G06F 21/64 |

* cited by examiner

*Primary Examiner* — Joseph P Hirl
*Assistant Examiner* — Leynna Truvan
(74) *Attorney, Agent, or Firm* — Bradley W. Schield; Richard M. Edge

(57) ABSTRACT

Disclosed herein are systems and methods that use blockchain technology to protect power system data. For example, a receiving device may receive a smart contract. The receiving device may obtain the encrypted power system measurements from the smart contract via distributed ledger. The receiving device may decrypt the power system measurements from the smart contract using a private key of the receiving device. The receiving device may display the decrypted power system measurements on a display of the receiving device.

15 Claims, 7 Drawing Sheets

INTEGRATION OF POWER SYSTEM DATA ONTO A DISTRIBUTED LEDGER

RELATED APPLICATION

This application claims priority under 35 U.S.C. § 119 to U.S. Provisional Patent Application No. 62/742,816 filed on Oct. 8, 2018, titled "Integration of Power System Data onto a Distributed Ledger," which application is hereby incorporated by reference in its entirety.

TECHNICAL FIELD

This disclosure relates to power systems and, more particularly, to using blockchain technology to communicate power system data.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
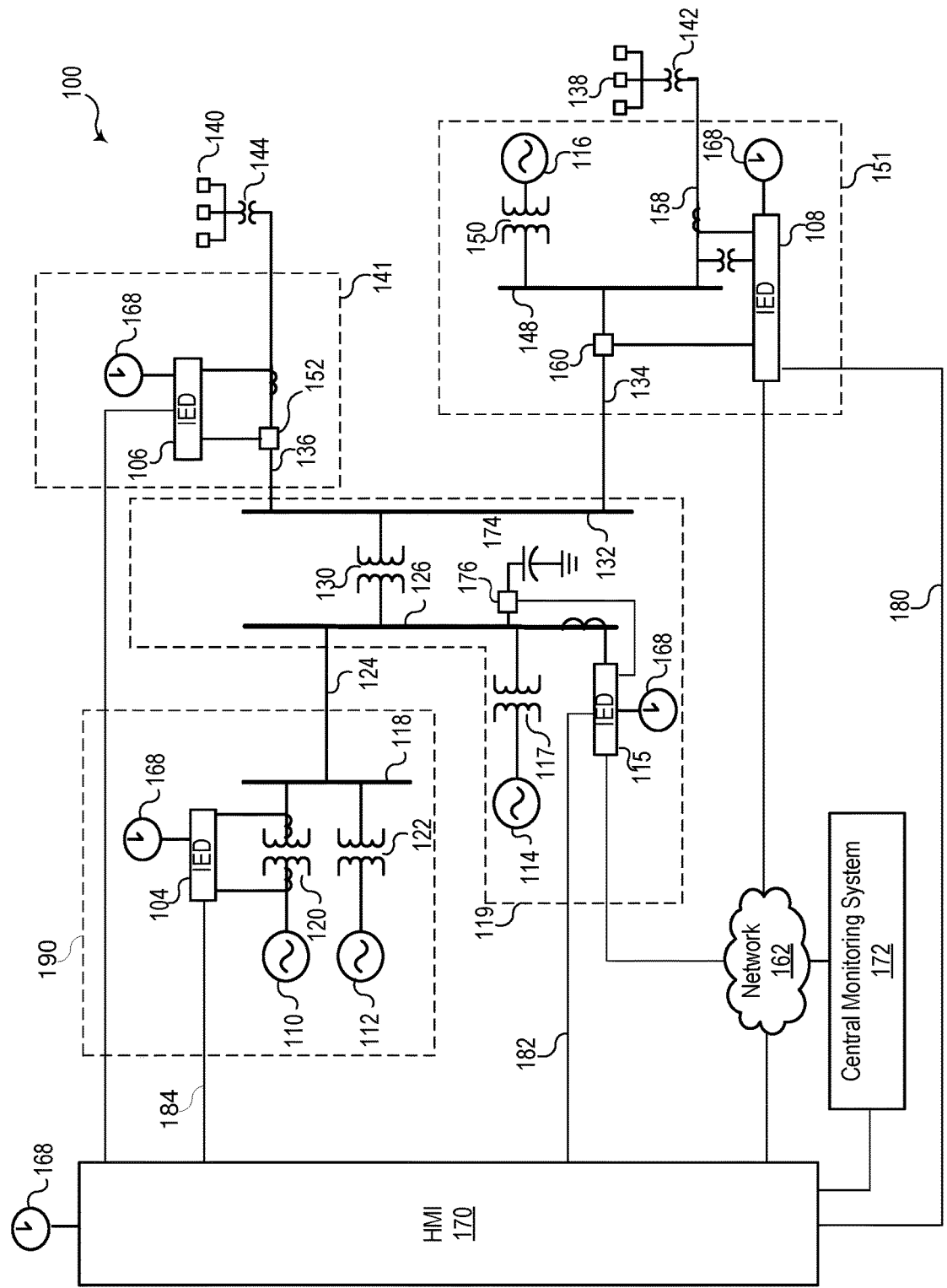
FIG. 1 illustrates a simplified one-line diagram of an electric power transmission and distribution system with an accompanying monitoring system.

Electric power delivery systems are used to distribute electric power from electric power generation sources to loads, which may be close or distant from the generation sources. Such systems may include generators or other sources, transformers step up or down voltages, transmission lines, buses, distribution lines, voltage regulators, capacitor banks, reactors, circuit breakers, switches, and other such equipment. Electric power distribution equipment may be monitored, automated and/or protected using intelligent electronic devices (IEDs).

IEDs may communicate power system data to various electronic devices in a communication network within the electric power delivery system. However, these communication networks may be vulnerable to cyber attacks. Accordingly, there is a need in power system networks to securely and reliably transmit data.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

FIG. 1 illustrates a simplified one-line diagram of an alternating current electric power transmission and distribution system 100 consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, 136, and 158), circuit breakers (e.g., breakers 152, 160, 176), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 190 may include two generating sources 110, 112 feeding bus 118 via transformers 120, 122. Transformer 120 may be monitored and protected using IED 104.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, the Human-to-machine interface (HMI) 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, and 115) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, digital sample publishing units, merging units, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors and sampled values. In various embodiments, IEDs 104, 106, 108, 115, and 170 may receive a common time signal 168. The time signal may be distributed in system 100 using a communications network 162 or using a common time source, such as a Global Navigation Satellite System ("GNSS"), or the like.

According to various embodiments, a control center, such as the central monitoring system 172 may comprise one or more of a variety of types of systems. For example, central monitoring system 172 may include a supervisory control and data acquisition (SCADA) system and/or a wide area control and situational awareness (WACSA) system. Central monitoring system 172 may be configured to provide protective operations for the system 100. An HMI 170 may be in communication with IEDs 104, 106, 108, and 115. IEDs 104, 106, 108 and 115 may be remote or local with respect to the HMI 170, and may communicate over various media such as a direct communication from IED 106 or over a wide-area communications network 162. According to various embodiments, certain IEDs may be in direct communication with other IEDs (e.g., IED 104 is in direct communication with HMI 170) or may be in communication via a communication network 162 (e.g., IED 108 is in communication with HMI 170 via communication network 162).

In various embodiments, IEDs 104, 106, 108, and 115 may be configured to monitor the frequency of alternating current waveforms in system 100. The measurements may be used in connection with the systems and methods disclosed herein for control of system 100. The IEDs may utilize common time source 168 to time-align measurements for comparison across system 100.

Network 162 may be used to transmit information among various components in system 100, including IEDs 108, 115, 170, and central monitoring system 172. In order to increase reliability, network 162 may include redundant communication paths between communicating devices. Such redundant paths may be selectively enabled when a first communication path is unavailable or disabled. Network 162 may include a variety of devices (e.g., multiplexers, routers, hubs, gateways, firewalls, switches, etc.) and technologies (e.g., connectionless communication network, SDN networks, etc.). In other embodiments, the HMI 170, the IEDs 104, 106, 108, and 115, and the central monitoring station 172 may communicate directly with each other.

Measurements made by IEDs 104, 106, 108, and 115 may be communicated to HMI 170 and/or central monitoring system 172. In some embodiments, one or more of IEDs 108 and 115 may be configured to send a confirmatory signal through network 162 to HMI 170. In the illustrated embodiment, the HMI 170 is in contact with IEDs 108 and 115 via analog communication channels 180 and 182, respectively.

The communication network may communicate data to a control center. However, as explained above, communication networks may be subject to cyber attacks. More particularly, cyber attacks may be used to alter, add, or remove data to manipulate control of the power system. Accordingly, there is a need to address securely communicating power system data.

FIGS. 2-5 are flow diagrams of a process that may integrate power system data onto a blockchain to prevent manipulation of the power system data, in accordance with an embodiment. Blockchain may refer to a distributed ledger that is distributed across more than one electronic device which records transactions immutably. That is, a consensus may be established across the electronic devices of the correct distributed ledger. Because the ledger is distributed, it may be more difficult to perform a cyber attack on a blockchain as compared to a centralized server. The processes described in FIGS. 2-5 may be stored as instructions (e.g., code) in memory of electronic device(s) to be executed by one or more processor(s) of the electronic device(s) to cause the processor(s) to perform the processes described herein.

Figure 2:
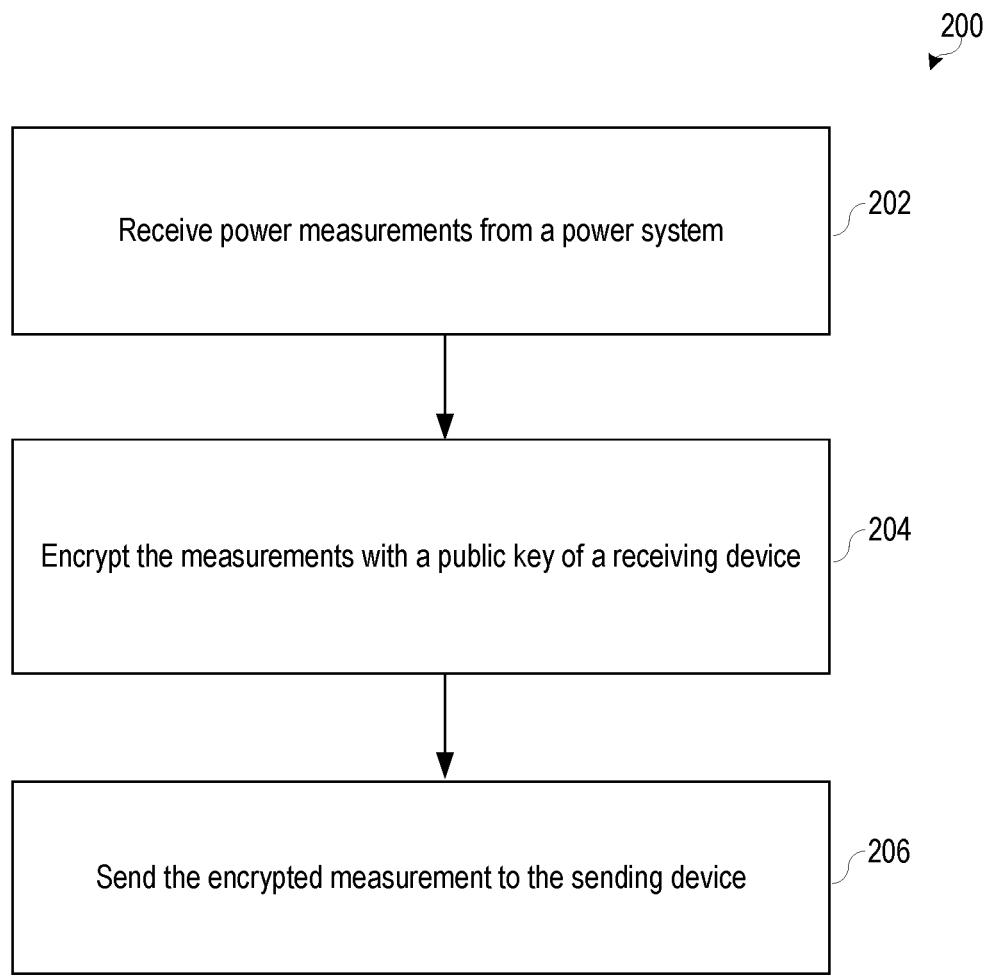
FIG. 2 illustrates a flow diagram of a process performed by a power system device of FIG. 1.

FIG. 2 is a flow diagram of a process 200 that may be performed by a power system device (e.g., synchrophasor, relay, faulted circuit indicator (FCI), etc.), such as IEDs 104, 106, 108, and 115. The process 200 may begin with the power system device acquiring power system measurements from a power system (block 202). For example, the power system device may obtain measurements of power system voltage, current, real and/or reactive power, frequency, load flow, power system settings (e.g., circuit breaker status), among others. For instance, the power system device may receive signals from a sensor affixed to a power line indicating current, voltage, or the like. In some embodiments, the power system measurements may include an associated time stamp indicating the time at which the measurement was taken.

The power system device may encrypt the power system measurements with a public key of a receiving device (block 204). As explained below, the receiving device may be, for example, the central monitoring station 172, which may use the power system measurements in determining control actions in the power system. The public key may be stored in the memory of the power system device, for example, during commissioning of the power system device or using any other suitable method. The power system device may send the encrypted measurements to a sending device (block 206) to allow the sending device to load the power system measurements into a smart contract.

Figure 3:
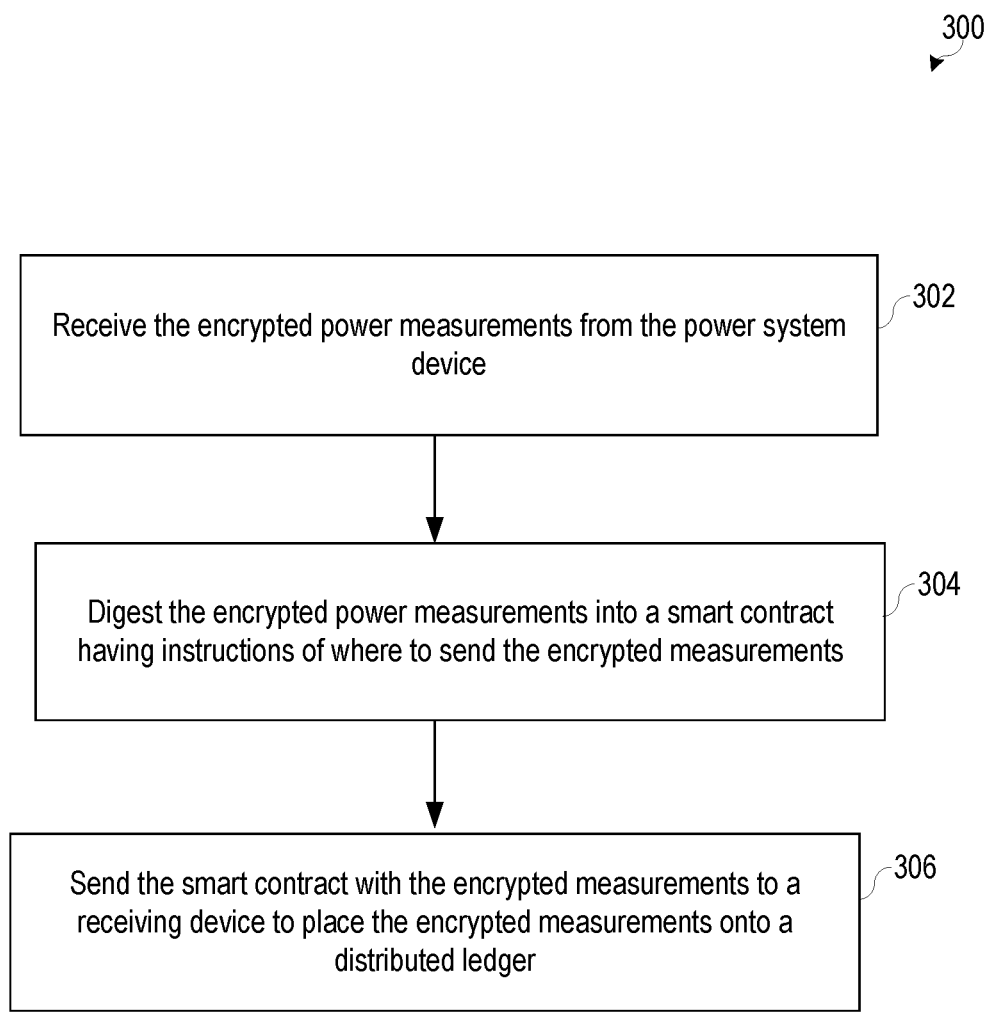
FIG. 3 illustrates flow diagram of a process performed by a (human-to-machine interface) HMI of FIG. 1

FIG. 3 is a flow chart of a process that may be performed by a sending device in the power system. For example, the sending device may be a Real-Time Automation Controller (RTAC) available from Schweitzer Engineering Laboratories located in Pullman, Wash. In other embodiments, the sending device may be embodied as the HMI 170 or another device that receives power system data and communicates with the central monitoring station 172. While these are given as examples, note that any suitable sending device may be used.

The process 300 may begin by receiving, at the sending device, the encrypted power measurements from the power system device (block 302). The sending device may then digest (e.g., load) the encrypted power measurement into a smart contract that has instructions of where to send the encrypted measurements to a receiving device (block 304). As described herein, a smart contract may refer to a self-executing agreement between the sending device and the receiving device written as a set of instructions (e.g., code). The smart contract may also be referred to as an ohm protocol or ohm token. For example, the sending device may have instructions of a memory address of the receiving device in which to communicate the encrypted power measurements. The sending device may then send the smart contract with the encrypted power measurements to the receiving device to place the encrypted measurements onto a distributed ledger (block 306). The smart contract may include a sending address of the sending device and a receiving address of the receiving device. The sending address and the receiving address may be mathematically related to secure the communication between the two devices. For example, the receiving address may be a public key address that is mathematically related to a private key stored on the receiving device. The mathematical relationship between the public key and the private key may allow the receiving device to decrypt the power system measurements.

Because the sending address and the receiving address are included in the smart contract (e.g., hardcoded), the communication of the data may be immutable. Further, by placing the smart contract with the encrypted power measurements onto the distributed ledger, the power system measurements are immutable. That is, the power system measurements and the communication between the sending device and the receiving device may not be altered or manipulated (e.g., without manipulating the proof of stake (PoS) or proof of work (PoW) of the blockchain).

Figure 4:
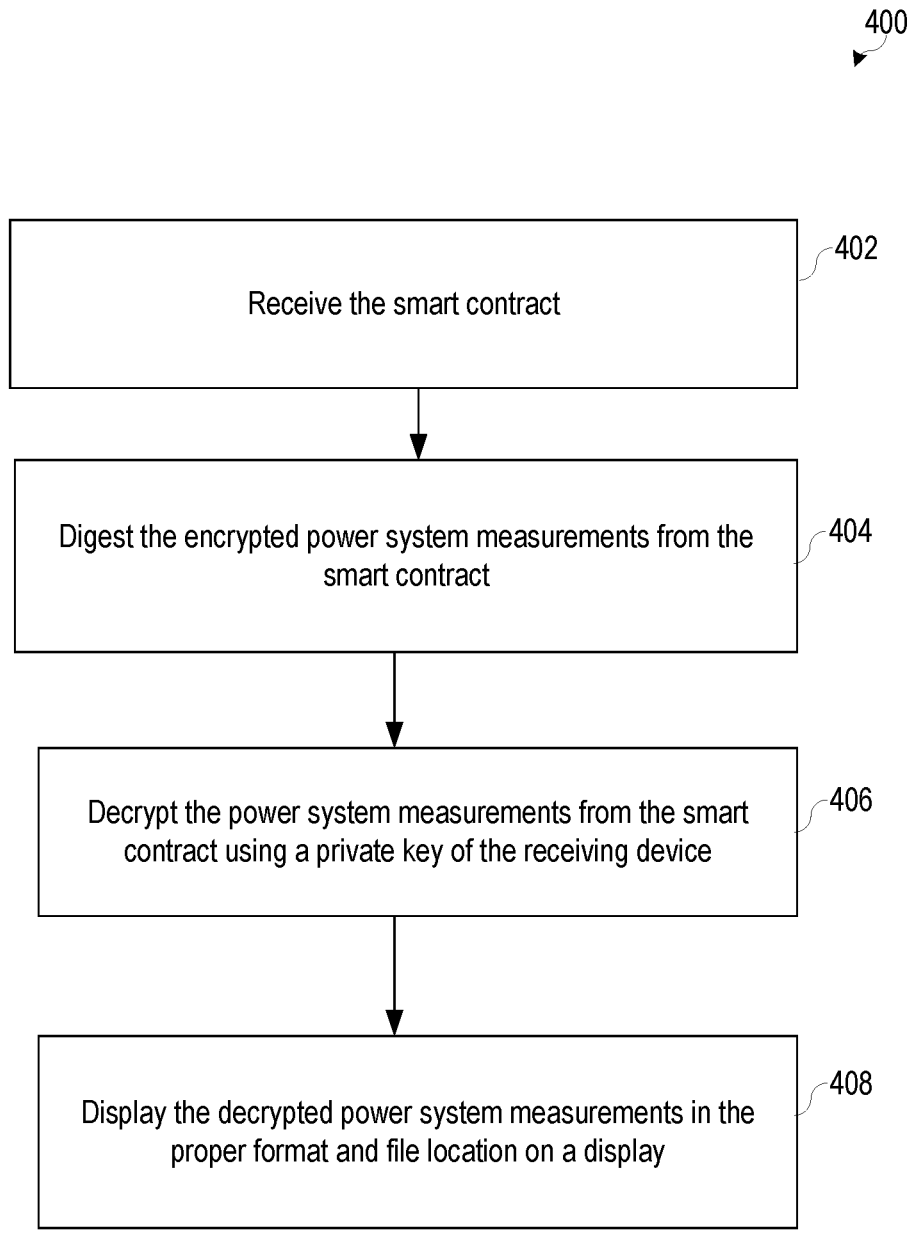
FIG. 4 illustrates a flow diagram of a process performed by the central monitoring system of FIG. 1.

FIG. 4 is a flow chart of process 400 that may be performed by the receiving device, in accordance with an embodiment. The receiving device may be, for example, a control center, such as the central monitoring system 172. The receiving device may receive the smart contract i.e. ohm token at the receiving address (e.g., the public key memory address) in the smart contract (block 402). Upon sending (from the sending device) or receiving (at the receiving device) the smart contract, the instructions stored on the smart contract may cause the smart contract to be inserted into the distributed ledger. For example, upon receiving the smart contract, the instructions in the smart contract may cause the receiving device to execute instructions that insert the smart contract having the encrypted power system measurements into the distributed ledger. In some embodiments, the distributed ledger may be a public blockchain that is available to other electronic devices outside of the power system network. In other embodiments, the distributed ledger may be a private blockchain that is a private distributed ledger for power system information.

By inserting encrypted power system measurements on the distributed ledger, the power system measurements may not be manipulated. Additionally, because the smart contract is self-executing, the sending device may ensure that the encrypted power system measurements are protected in communicating the encrypted power system measurements and ensuring that the encrypted power system measurements are inserted on to the distributed ledger. Further, because the receiving device has the private key that corresponds to the public key used to encrypt the power system measurements, the receiving device may decrypt the received power system measurements while any device without the private key may be unable to decrypt the power system measurement.

In some embodiments, the receiving device may download one or more encrypted power system measurements from the distributed ledger. For example, the receiving device may download historical data over a period of time from the distributed ledger that is ensured to be accurate (e.g., immutable) due to the properties of the distributed ledger. Because the power system measurements are stored on the distributed ledger while encrypted, other devices may be unable to determine the power system measurements without the private key of the receiving device.

Figure 5:
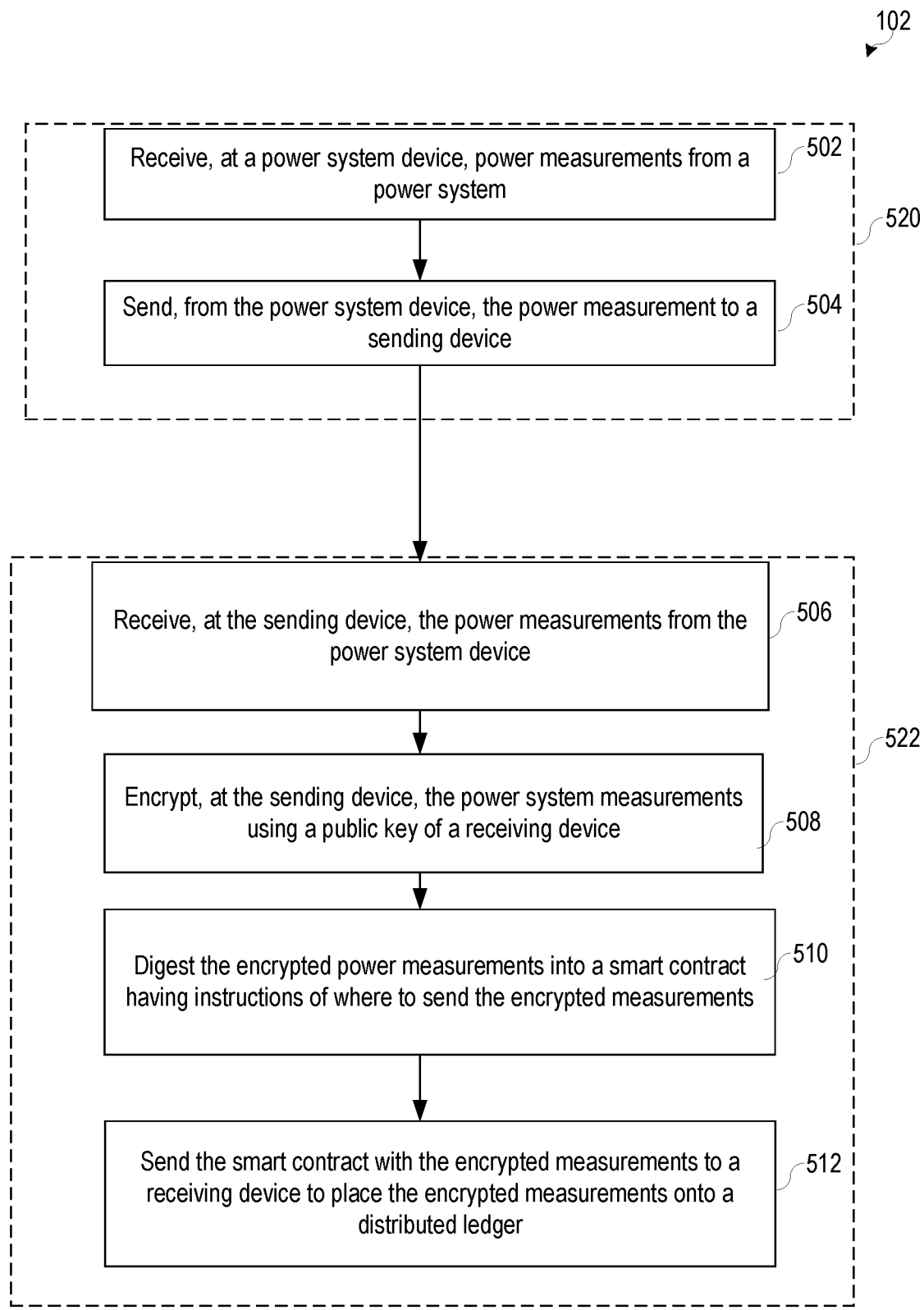
FIG. 5 illustrates another flow diagram of a process performed by the power system device and the HMI of FIG. 1.

FIG. 5 is another embodiment of a flow diagram of a process 500 that may be performed by the power system device (as noted by reference 520) and the sending device (as noted by reference 522). The power system device may receive a power system measurement from a power system (block 502). The power system device may then send the power system measurement to a sending device (block 504). That is, the power system device may relay the power system measurements to the sending device without encrypting (as in FIG. 5) to reduce the processing performed by the power system device.

The sending device may receive the power system measurement from the power system device (block 506). The sending device may encrypt the power system measurement using a public key associated with the receiving device (block 508). The sending device may digest the encrypted power system measurement into a smart contract having instructions of where to send the encrypted measurements (block 510). The sending device may then send the smart contract with the encrypted power system measurement to the receiving device to place the encrypted measurements onto a distributed ledger (block 512), as described in FIG. 4.

Figure 6:
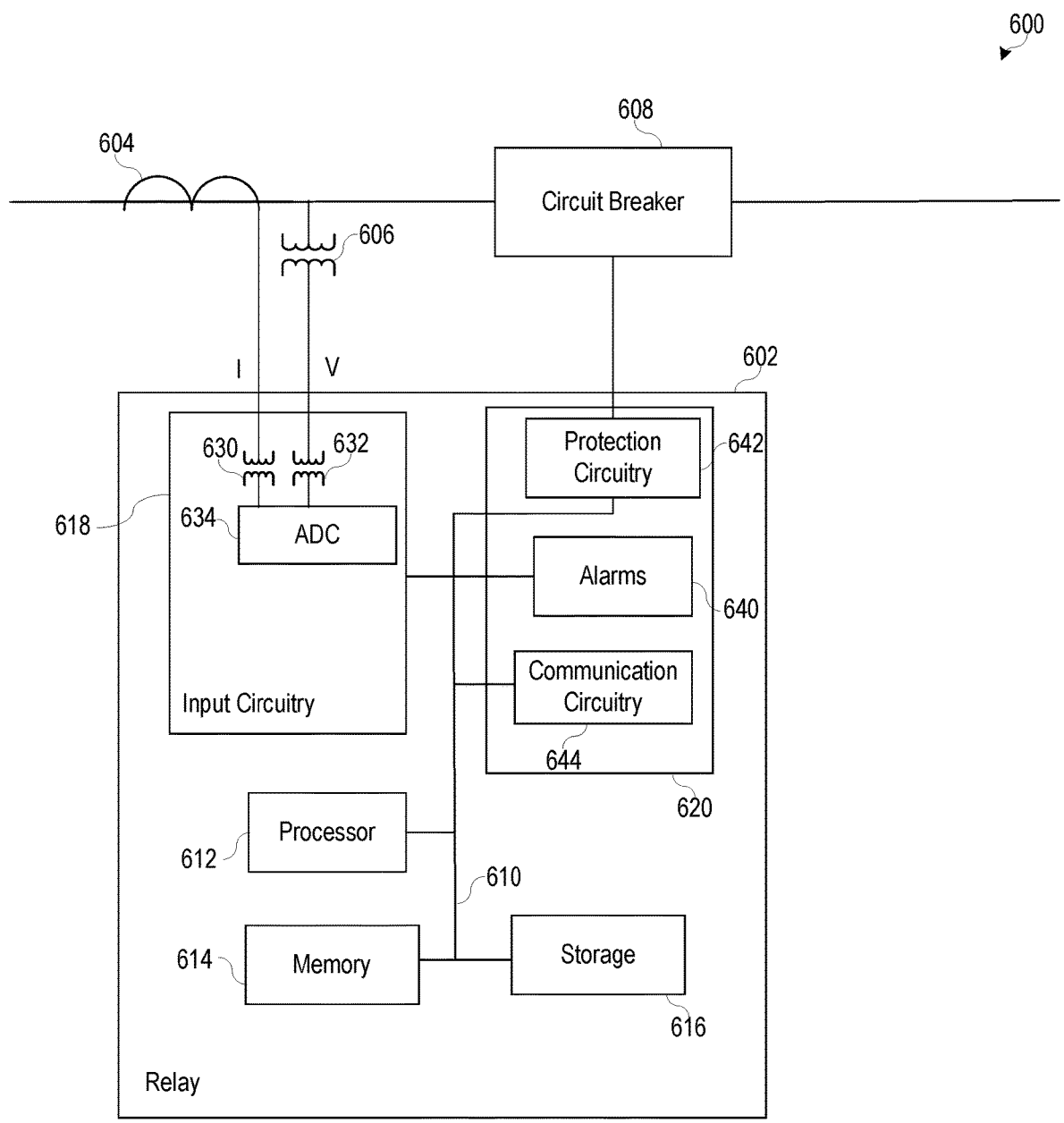
FIG. 6 illustrates a block diagram of a power system device of FIG. 1 that may be used in the processes performed in FIGS. 2 and 5, in accordance with an embodiment.

FIG. 6 is a block diagram of an embodiment of a power system device 600 that may be used to perform the processes described in FIGS. 2 and 5, in accordance with an embodiment. The power system device 600 may refer to an IED, such as a synchrophasor, a faulted circuit indicator (FCI), or a relay. In the illustrated embodiment, power system device 600 may be embodied as a relay 602 having current transformer(s) (CTs) 604 and potential transformer(s) (PTs) 606, and a circuit breaker 608.

In the illustrated embodiment, the relay 602 includes a bus 610 connecting a processor 612 or processing unit(s) to a memory 614, a computer-readable storage medium 616, input circuitry 618, and output circuitry 620. The computer-readable storage medium 616 may include or interface with software, hardware, or firmware modules for implementing various portions of the systems and methods described herein. The computer-readable storage medium 616 may be the repository of one or more modules and/or executable instructions configured to implement any of the processes described herein. In some embodiments, the computer-readable storage medium 616 and the modules therein may all be implemented as hardware components, such as via discrete electrical components, via a Field Programmable Gate Array ("FPGA"), and/or via one or more Application Specific Integrated Circuits ("ASICs").

The processor 612 may be configured to process inputs received via the input circuitry 618. The processor 612 may operate using any number of processing rates and architectures. The processor 612 may be configured to perform various algorithms and calculations described herein using computer executable instructions stored on computer-readable storage medium 616. Processor 612 may be embodied as a microprocessor, a general purpose integrated circuit, an ASIC, a FPGA, and/or other programmable logic devices.

In the illustrated embodiment, the input circuitry 618 receives electric current and voltage signals from the current transformer 604 and the voltage transformer 606 respectively, transforms the signals using respective potential transformer(s) 630 and 632 to a level that may be sampled, and samples the signals using, for example, A/D converter(s) 634 to produce digitized analog signals representative of measured current and voltage on the transmission line. Similar values may also be received from other distributed controllers, station controllers, regional controllers, or centralized controllers. The values may be in a digital format or other format. In certain embodiments, the input circuitry 618 may be utilized to monitor current signals associated with a portion of an electric power transmission system. Further, the input circuitry 618 may monitor a wide range of characteristics associated with monitored equipment, including equipment status, temperature, frequency, pressure, density, infrared absorption, radio-frequency information, partial pressures, viscosity, speed, rotational velocity, mass, switch status, valve status, circuit breaker status, tap status, meter readings, conductor sag and the like.

The A/D converter 634 may be connected to the processor 612 by way of the bus 610, through which digitized representations of current and voltage signals may be transmitted to the processor 612. As described above, the processor 612 may be used to monitor and protect portions of the electric power transmission system, and issue control instructions in response to the same (e.g., instructions implementing protective actions). The processor 612 may affect a control operation on the electric power delivery system 100 via the output circuitry 620. The output circuitry 620 may include one or more alarms 640 and/or protection circuitry 642. The one or more alarms 640 may include LEDs, a display screen to display a notification, a transceiver to communicate with one or more other intelligent electronic devices and/or a central monitoring station, or the like. In the illustrated embodiment, the processor 612 may control operation of the circuit breaker 608 upon detecting various operating characteristics of the power system. In some embodiments, the processor 612 may cause the transceiver to send a signal indicating power measurements of the power characteristics of the power system. Further, the processor 612 may activate the alarms 640 based on the detected power measurements. The communication circuitry 644 may include a transceiver that sends and/or receives signals. For example, the processor 612 may cause the transceiver to transmit the power measurements to be stored in the blockchain using the electronic devices described with respect to FIG. 7.

Figure 7:
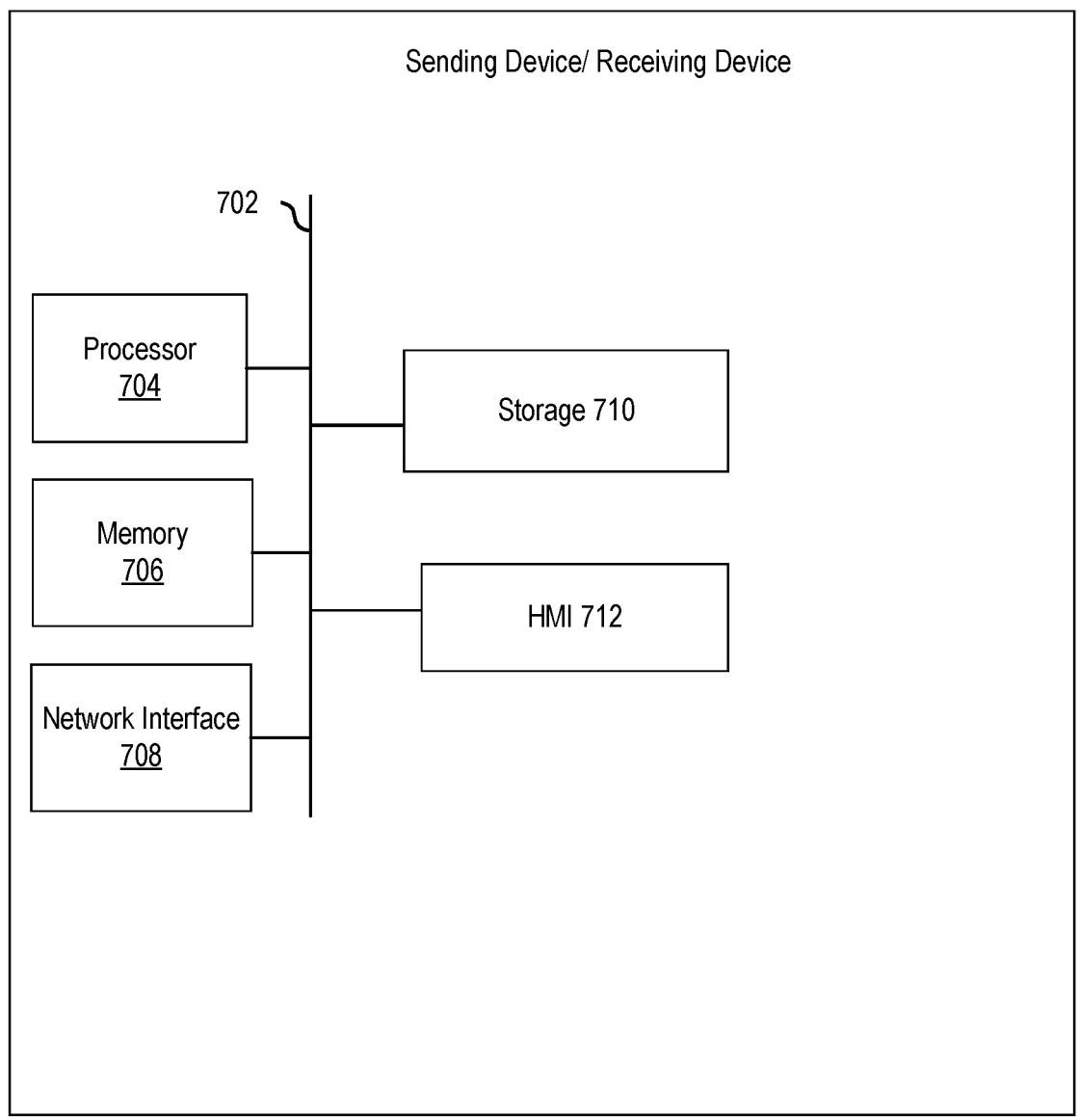
FIG. 7 illustrates a block diagram of an HMI and/or a central monitoring system of FIG. 1 that may be used in the processes performed in FIGS. 3-5, in accordance with an embodiment.

FIG. 7 illustrates a block diagram of an embodiment of a sending device and/or receiving device described with respect to FIGS. 3-5. Similarly, the electronic device 700 may include a bus 702 connecting a processor 704 or processing unit(s) to a memory 706, communication circuitry 708 (e.g., transceiver), and a computer-readable storage medium 710. The communications circuitry may communicate with the power system device 600, one or more other IEDs 104, 106, 108, and 115, the sending device (e.g., an RTAC), the receiving device (e.g., a central monitoring station), or any combination thereof. The computer-readable storage medium 710 may include or interface with software, hardware, or firmware modules for implementing various portions of the systems and methods described herein with respect to FIGS. 3-5. The separation of the modules is merely an example, and any combination of the modules or further division may be possible. Some of the components may have similar descriptions to some of the similar components described above with respect to FIG. 6.

The electronic device 700 may further include a human-to-machine interface (HMI) that allows users to view the decrypted power system measurements or any other suitable data derived from those measurements. The HMI may include a display (e.g., touchscreen), keyboard, or the like to allow an operator to input controls into the electronic device 700 and to cause the electronic device 700 to display the power system data. For example, the processor 704 may send a signal to the HMI 712 to cause the HMI 712 to display characteristics of the state of the power system based on the decrypted power system measurements.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims:

What is claimed is:

1. A sending device, comprising:
    a memory; and
    one or more processors operatively coupled to the memory, wherein the one or more processors are configured to:
        obtain a power system measurement of an operating characteristic of a power system during operation;
        encrypt the power system measurement with a public key of a designated receiving device;
        load the encrypted power system measurement into a smart contract to store the power system measurement; and
        send the smart contract to a pre-defined address of the designated receiving device, built into the smart contract during commissioning of the sending device prior to obtaining the power system measurement, to cause the smart contract to be inserted onto a distributed ledger to prevent modification of the power system measurement and to allow the designated receiving device to decrypt the encrypted power system data using a private key, corresponding to the public key of the designated receiving device.

2. The sending device of claim 1, wherein the one or more processors are configured to encrypt the power system measurement prior to loading the power system measurement into the smart contract.

3. The sending device of claim 2, wherein the one or more processors are configured to encrypt the power system measuring using a public key of the receiving device.

4. The sending device of claim 2, wherein the one or more processors are configured to automatically place the encrypted measurements onto the distributed ledger upon sending the smart contract to the receiving device due to instructions in the smart contract.

5. The sending device of claim 1, wherein the distributed ledger comprises a private distributed ledger associated with the power system.

6. The sending device of claim 1, wherein the one or more processors are configured to receive the power system measurement from a power system device in the power system.

7. A receiving device, comprising:
    a memory; and
    one or more processors operatively coupled to the memory, wherein the one or more processors are configured to:
        receiving, from a sending device, a smart contract having an encrypted power system measurement during operation that is encrypted with a public key of the receiving device, wherein the smart contract has a pre-defined address of the receiving device built into the smart contract during commissioning of the sending device prior to obtaining the power system measurement;
        obtaining the encrypted power system measurement from the smart contract; and
        decrypting the power system measurement using a private key, corresponding to the public key of the receiving device.

8. The receiving device of claim 7, wherein the one or more processors are configured to automatically insert the smart contract onto a distributed ledger upon receiving the smart contract to prevent modification of the power system measurement.

9. The receiving device of claim 7, wherein the distributed ledger comprises a publicly available distributed ledger.

10. The receiving device of claim 9, comprising a display screen, wherein the one or more processors are configured to display the decrypted power system measurement on the display screen.

11. The receiving device of claim 7, wherein the smart contract comprises self-executing instructions to ensure immutability of the obtained encrypted power system measurement.

12. The receiving device of claim 7, wherein the one or more processors are configured to decrypt the encrypted power system measurement via a private key of the receiving device that is associated with a public key, wherein the public key is used to encrypt the power system measurement.

13. A method, comprising:
    obtaining, via a sending device, a power system measurement of a power system during operation;
    encrypting, at the sending device, the power system measurement with a public key of a designated receiving device;
    inserting, via the sending device, the encrypted power system measurement onto a smart contract;
    sending, via the sending device, the smart contract to a pre-defined address of the designated receiving device built into the smart contract during commissioning, prior to obtaining the power system measurement, to cause the power system measurement to be inserted onto a distributed ledger to prevent mutability of the power system measurement; and
    decrypting, via the designated receiving device, the power system measurement in the smart contract using a private key, corresponding to the public key of the designated receiving device.

14. The method of claim 13, comprising obtaining, via the sending device, the power system measurement encrypted by a power system device.

15. The method of claim 13, wherein the distributed ledger is stored at least on a plurality of devices to prevent mutability of the power system measurement.

* * * * *